United States Patent [19]

O'Brien et al.

[11] Patent Number: 5,587,876

[45] Date of Patent: Dec. 24, 1996

[54] MODULAR MONITOR ARCHITECTURE

[75] Inventors: John O'Brien; Jonathan Ive, both of San Francisco, Calif.

[73] Assignee: Apple Computer, Inc., Cupertino, Calif.

[21] Appl. No.: 413,401

[22] Filed: Mar. 30, 1995

[51] Int. Cl.$^6$ .................................................. H05K 7/16
[52] U.S. Cl. ........................... 361/682; 361/681; 248/923
[58] Field of Search .................................. 361/681–683; 312/223.1, 223.2, 223.3; 348/825–843, 787, 789, 794; 248/917–924

[56] References Cited

U.S. PATENT DOCUMENTS

| | | | |
|---|---|---|---|
| D. 358,807 | 5/1995 | Ratcliffe et al. | D14/100 |
| 4,880,191 | 11/1989 | Lake, Jr. | 248/371 |
| 5,209,446 | 5/1993 | Kawai | 248/920 |
| 5,247,428 | 9/1993 | Yu | 361/680 |

*Primary Examiner*—Leo P. Picard
*Assistant Examiner*—Lynn D. Feild
*Attorney, Agent, or Firm*—Greg T. Sueoka; Mark C. Terrano

[57] ABSTRACT

A modular monitor architecture based on a CRT comprises a base, a tilt/swivel module, a display module, and an input module. The base is coupled to and supports the tilt/swivel module. The display module is mounted on the tilt/swivel module and also defines a cavity for receiving the input module. The input module is attached to the display module in the cavity. Each module may take a variety of forms depending on the features that are provided by a particular variant. The tilt/swivel module may have a first form that provides the coupling that allows rotation and tilting of the display module or a second form that provides audio input and output in addition to the mobility features of the first form. Similarly, the display module has a first form for housing a smaller sized CRT and a second form for housing a larger sized CRT. Finally, the input module may have three forms: one for no input, a second for audio input or alternatively IR input, and an third for audio and video input.

18 Claims, 7 Drawing Sheets

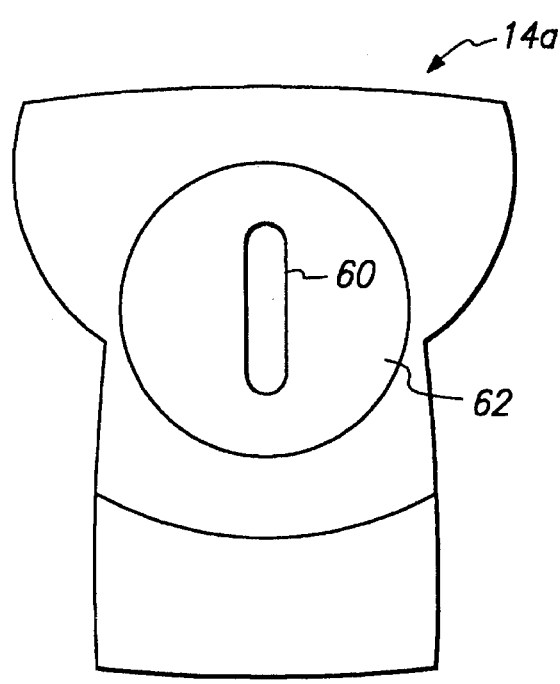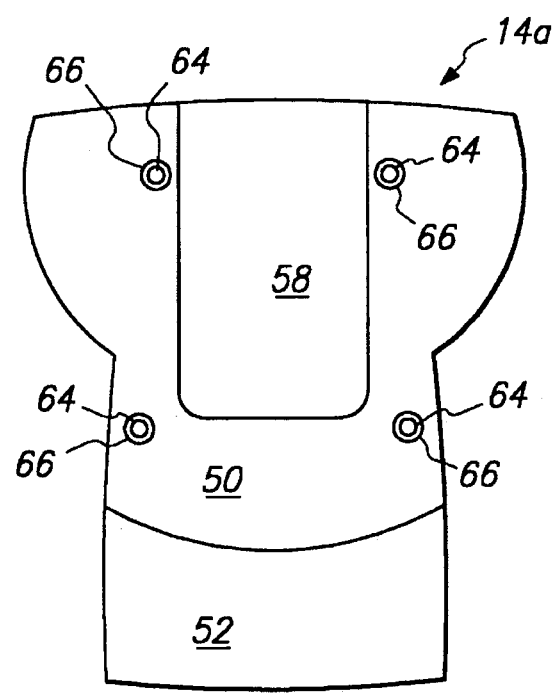
FIG. 4A          FIG. 4B
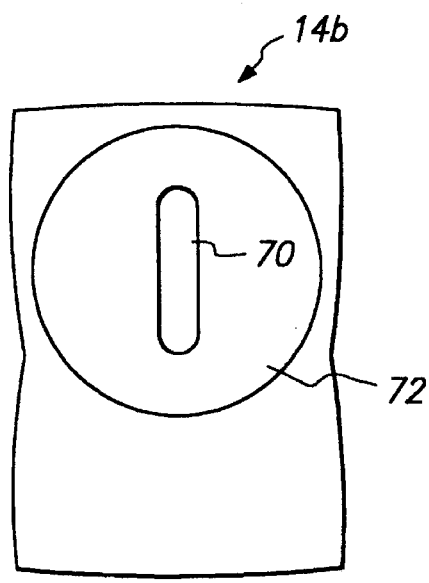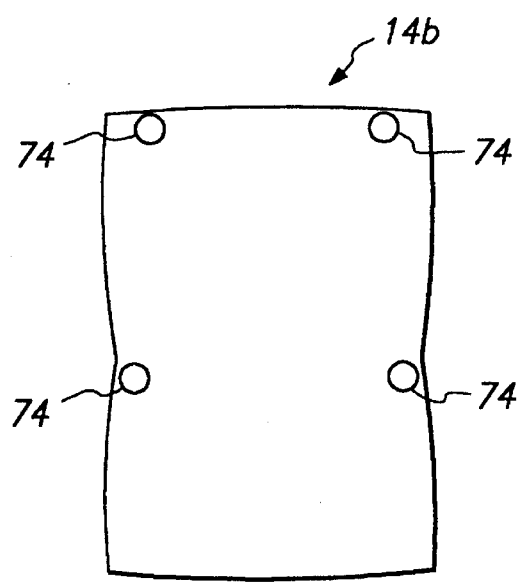
FIG. 4C          FIG. 4D

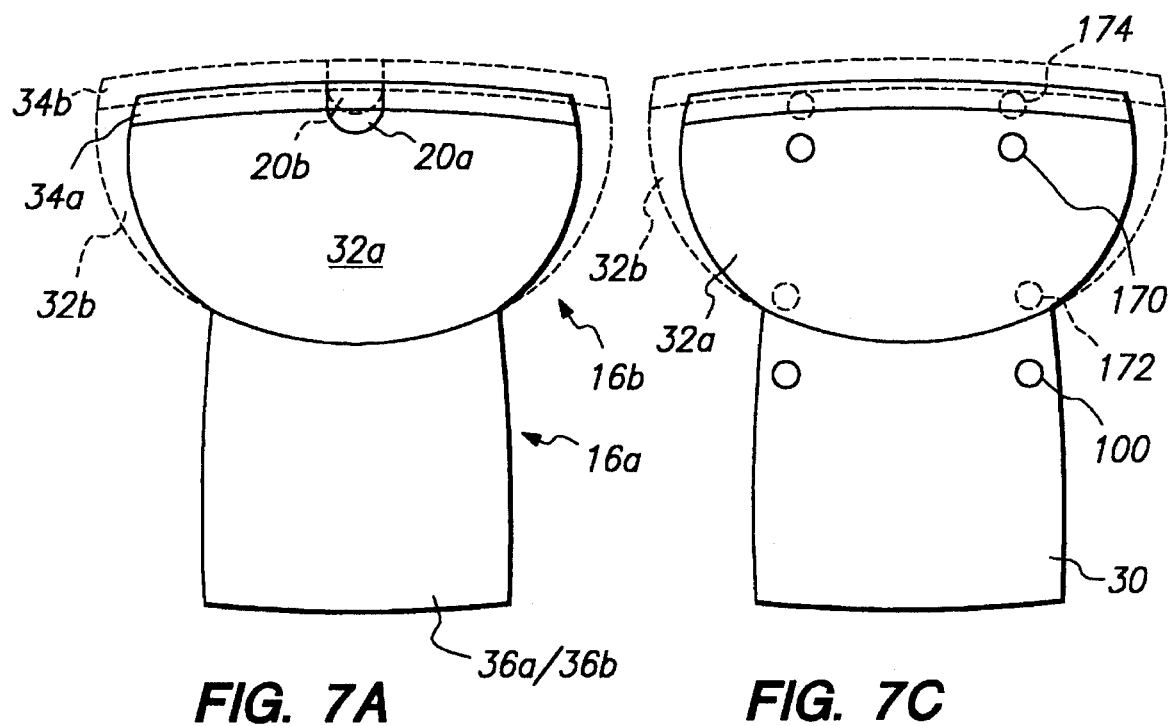
FIG. 7A
FIG. 7C
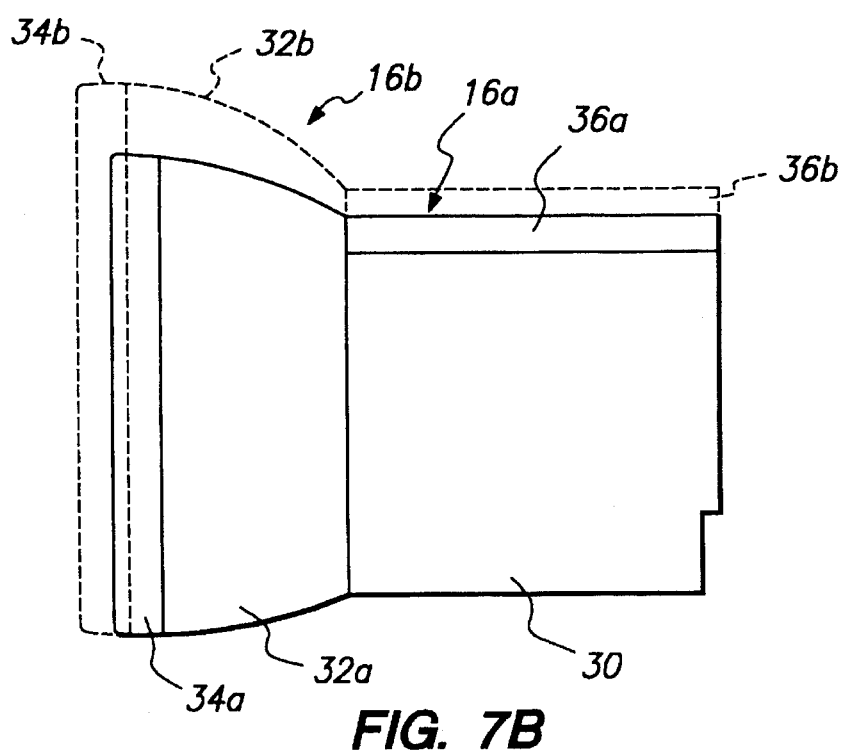
FIG. 7B

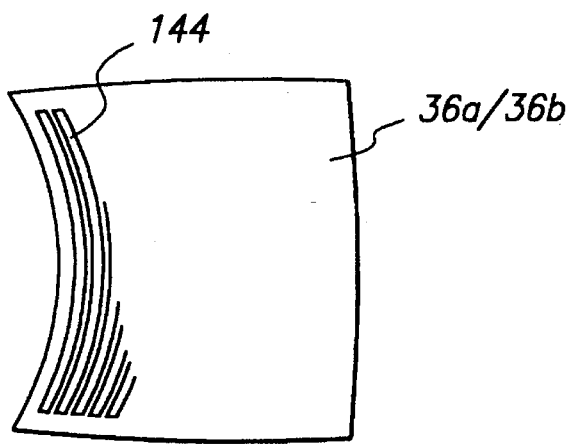 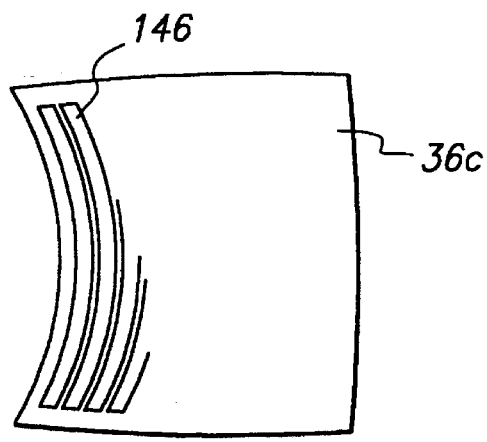
FIG. 8A  FIG. 8B
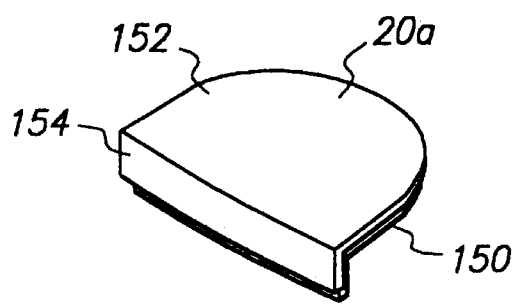 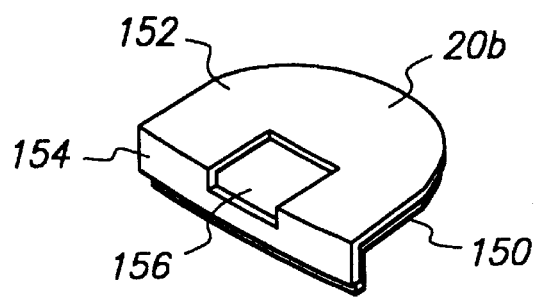
FIG. 9A  FIG. 9B
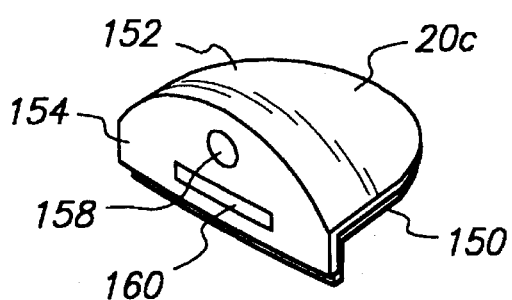
FIG. 9C

MODULAR MONITOR ARCHITECTURE

CROSS-REFERENCE TO RELATED APPLICATIONS

This application relates to U.S. patent application Ser. No. 08/412,704, entitled "Integral Sound Module For A Modular Monitor," filed Mar. 29, 1992, U.S. patent application Ser. No. 08/418,673, entitled "Multipiece Monitor Bucket Having Vented Joints," filed Apr. 7, 1995; and U.S. patent application Ser. No. 08/456,628, entitled "Monitor Bucket Having A Removable Thermal Vent," filed Jun. 1, 1995; all of which are incorporated herein by reference.

BACKGROUND OF THE INVENTION

1. Field of the Invention

The present invention relates generally to output devices for computers, and more particularly, to a modular architecture for output devices that are based on use of a cathode-ray tube (CRT). Still more particularly, the present invention relates to a modular architecture that can be used to produce a number of output devices that include various combinations of additional features such as providing audio output, audio input, visual input and storage areas.

2. Description of the Background Art

The use of computers generally and the diversity of applications for which they may be used has increased greatly in recent years. One particular area of increased use for computers has been multimedia. With multimedia, computers are no longer limited to providing only visual output by displaying images on a display device, but are also required and expected to provide for audio output, audio input, visual input, as well as the use of relatively new media like compact discs and wireless local area networks (LANs). One common approach to satisfying the need for such multimedia devices has been to create new integrated input/output devices that include both a conventional CRT as well as the other components that provide the audio output, audio input, and visual input.

However, such integrated input/output devices have been slow to be produced in mass quantities because of the design effort and time that is required to create such an integrated multiple input/output device. Monitors have traditionally been designed with a dedicated process where all features (e.g., types of input and output capabilities) that the monitor will have are first defined, and then the monitor is designed from the ground up. For example, an integrated input/output device that includes a CRT, speakers for audio output, a microphone for audio input and a video camera for video input, would be designed with the minimum number of parts necessary to house and contain those components. The design is then tested to ensure the proper structural strength and the operability of each of the components. The design process must account for proper isolation between different features such as the monitor and the speakers to make sure that their simultaneous operation does not degrade either component's performance. Once the design has been tested, tooling must be done so that the components can be made in mass quantities. This process can be very time consuming and expensive, and has been a significant cause of the delayed entry of new monitors having multiple features into the market place.

Another problem with the above described approach to constructing and designing monitors is that the same delay to market is encountered each time a new technology is incorporated with the monitor. For example, consider an infrared (IR) transceiver that might be integrated into the monitor design for use with wireless LANs. Monitors including such an IR transceiver suffer from the same delay and costs of being designed and tested from the ground up just to add the new technology. Thus, there is a need for a system and method of designing and constructing new integrated multiple input/output devices with added functionality more quickly.

Since monitors require such a significant investment of time and resources to develop, the variations of features that an integrated multiple input/output device have continue to be very limited. For example, there are many monitors that provide only a visual output capability. There are also some integrated input/output devices that include video output, audio input, and audio output capabilities. However, there are a number of other intermediate combinations of features such as only video output and video input for which no integrated input/output device exists. Thus, users are forced to choose between the most basic conventional monitor configuration that only provides video output and a monitor that includes all additional features because manufactures do not create monitors with various intermediate combinations of features due to the cost of developing each variation. The limited selection of features offered to the user is even heightened when size of the CRT is considered as an additional feature. For example, only certain sized CRTs are combined with speakers to create integrated multimedia systems.

Therefore, there is a need for a monitor architecture that eliminates the above problems of the prior art, and allows integrated monitors with multiple input and output features to be quickly and easily developed.

SUMMARY OF THE INVENTION

The present invention overcomes the problems and shortcomings of the prior art by providing a modular monitor architecture based on the CRT. In particular, the present invention provides a modular monitor architecture that reduces the amount of time and design effort required to produce an integrated multiple input/output device. The modular monitor architecture also facilitates faster and easier development of a family of monitor model variants from a common stock of modules. The preferred embodiment of the present invention is a modular monitor architecture that comprises a base, a tilt/swivel module, a display module, and an input module. Regardless of the variant of the monitor being produced, the monitor has a base that is coupled to and supports the tilt/swivel module. The display module is mounted on the tilt/swivel module and also defines a cavity for receiving the input module. The input module is attached to the display module in the cavity. Each of the modules may take a variety of forms depending on the features that are provided by the particular variant. More specifically, the tilt/swivel module may have two forms in the preferred embodiment. A first tilt/swivel module form provides the coupling that allows the display module and input module to be rotated and tilted with respect to the base. A second tilt/swivel module form provides for audio output in addition to the mobility features of the first form. Similarly, the display module has a first form for housing a smaller sized CRT and a second form for housing a larger sized CRT. The display module also provides a further level of modularity because some of the constituent parts are also modules. Finally, the input module may have three forms: one for no input, a second for audio input or alternatively IR input, and a third for audio and video input.

BRIEF DESCRIPTION OF THE DRAWINGS

FIGS. 4A and 4B are a bottom plan view and a top plan view, respectively, of a first embodiment of the tilt/swivel module of the present invention;

FIGS. 4C and 4D are a bottom plan view and a top plan view, respectively, of a second embodiment of the tilt/swivel module of the present invention;

FIG. 7A is a top view for a first embodiment of the display module of the present invention with a second embodiment of the display module shown by phantom lines;

FIG. 7B is a side view of the first embodiment of the display module of the present invention with the second embodiment of the display module shown by phantom lines;

FIG. 7C is a bottom plan view of the first embodiment of the display module of the present invention with the second embodiment of the display module shown by phantom lines;.

FIG. 8A is a top plan view for a first and a second embodiment of a lid of the display module of the present invention;

FIG. 8B is a top plan view of a third embodiment of the lid of the display module of the present invention;

FIG. 9A is a perspective view of a first embodiment of the input module of the present invention;

FIG. 9B is a perspective view of a second embodiment of the input module of the present invention; and FIG. 9C is a perspective view of a first embodiment of the input module of the present invention;

DETAILED DESCRIPTION OF THE PREFERRED EMBODIMENTS

Figure 1:
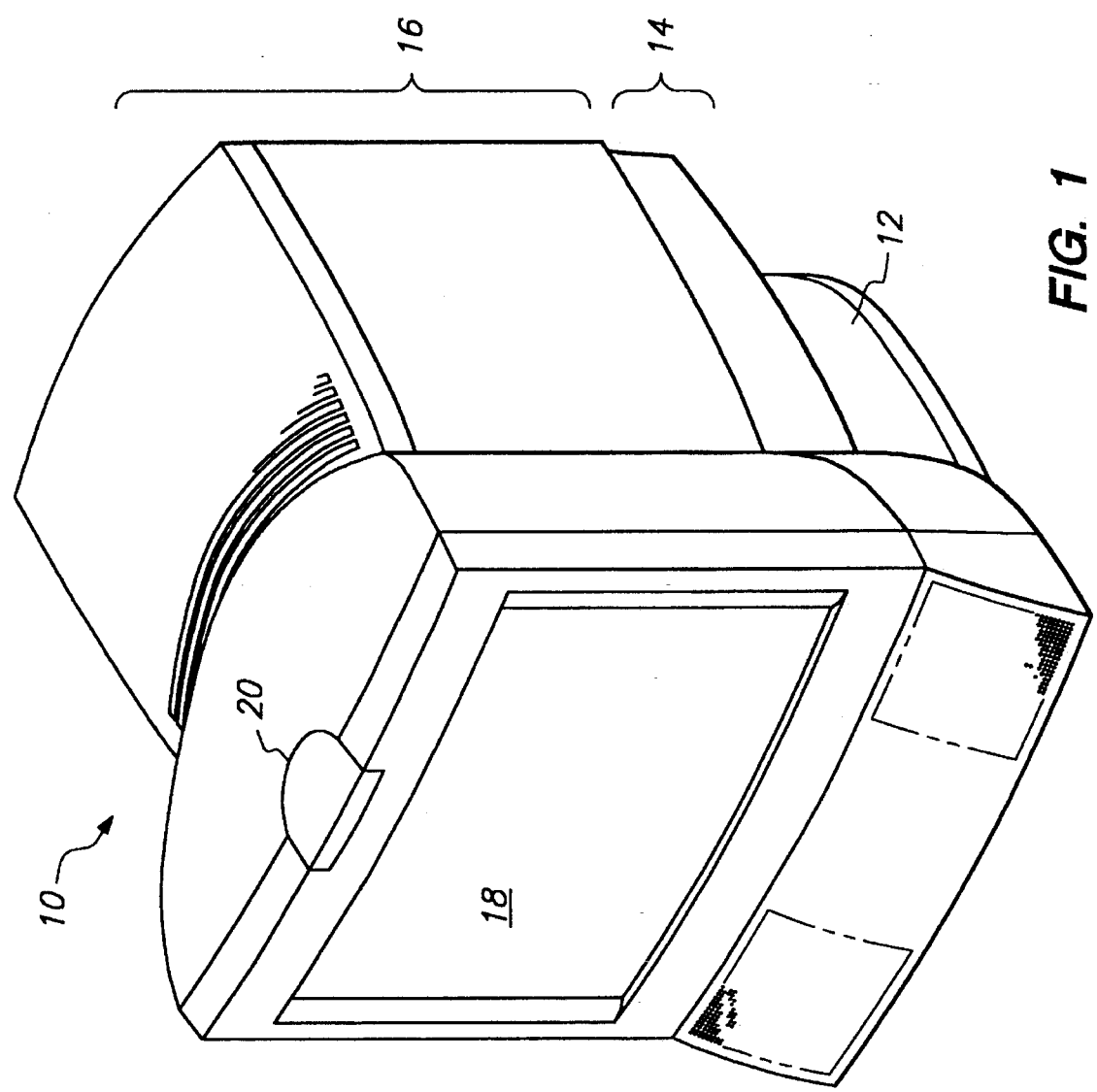
FIG. 1 is a perspective view of a first embodiment of a modular monitor architecture of the present invention providing for audio output.

FIG. 1 shows a perspective view of an embodiment of a modular monitor architecture 10 of the present invention. The modular monitor architecture 10 preferably comprises a base 12, a tilt/swivel module 14, a display module 16 that houses a CRT 18, and an input module 20. While the modular monitor 10 of Figure I is shown as including an embodiment of the tilt/swivel module 14 capable of producing sound, this is for illustration purposes only, and as will be described below, the tilt/swivel module 14 may take a variety of configurations. Each of the modules 14, 16, 20 has a minimum amount of functionality or features, and also conforms to standard couplings for attachment to other modules 14, 16, 20. For example, all tilt/swivel modules 14a and 14b provide for connection with the base 12 and attachment with the display module 16. This standardization allows any of the modules 14, 16, 20 of the present invention to be used interchangeably with any of the other modules 14, 16, 20. This is particularly advantageous because the modular monitor architecture 10 allows design efforts to be reused and thereby greatly reduces the time and effort required to produce many different monitors each having various combinations of features.

Figure 2:
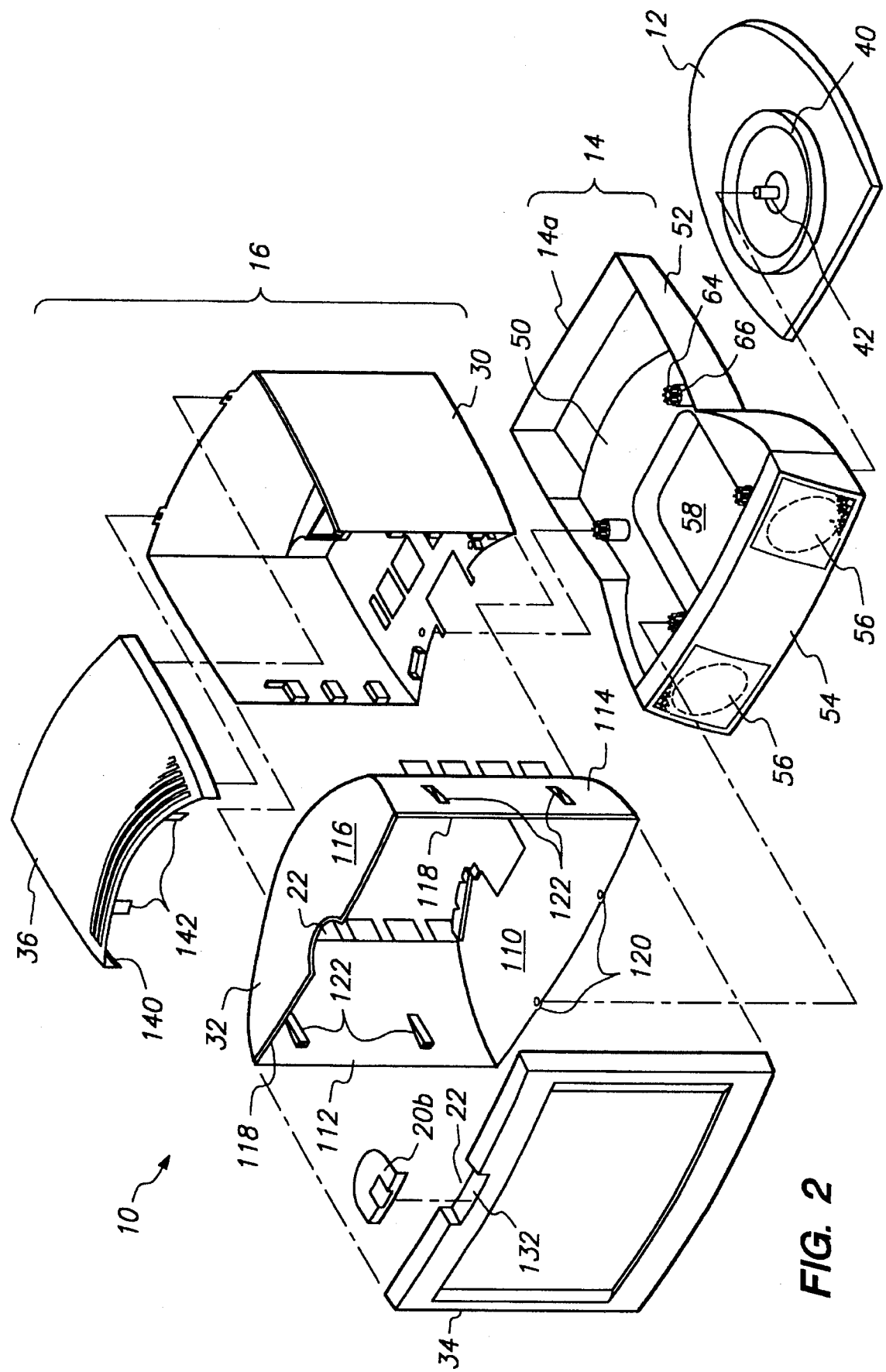
FIG. 2 is an exploded perspective view of the first embodiment of the modular monitor architecture of the present invention providing for audio output.

FIG. 2 shows an exploded perspective view of a first embodiment of the modular monitor architecture 10 of FIG. 1 without the CRT 18. Referring now to FIG. 2, the connections between the modules 14, 16, 20 are shown in more detail. Moving from the bottom upward, the modular monitor architecture 10 begins with the base 12. The tilt/swivel module 14 is mounted on top of the base 12 by a first attachment means. The base 12 and tilt/swivel module 14 are mounted together such that the tilt/swivel module 14 can be tilted and rotated with respect to the base 12. On top of the tilt/swivel module 14, the display module 16 is mounted in a static manner by a second attachment means such that the tilt/swivel module 14 and the display module 16 will rotate and tilt together when either is moved.

The display module 16 also defines an aperture 22 in which the input module 20 is mounted. The display module 16 preferably comprises an aft bucket 30, a middle bucket 32, a bezel 34 and a lid 36. The aft bucket 30 and the middle bucket 32 are attached together and form a housing for the CRT 18. The bezel 34 is mounted on the front of the middle bucket 32 and secures the CRT 18 in the aft bucket 30 and the middle bucket 32. The lid 36 is attached on the top of the aft bucket and encloses the CRT 18. The bucket 30, middle bucket 32, bezel 34 and lid 36 are preferably constructed as single pieces of hardened plastic using an injection molding process.

Figure 3:
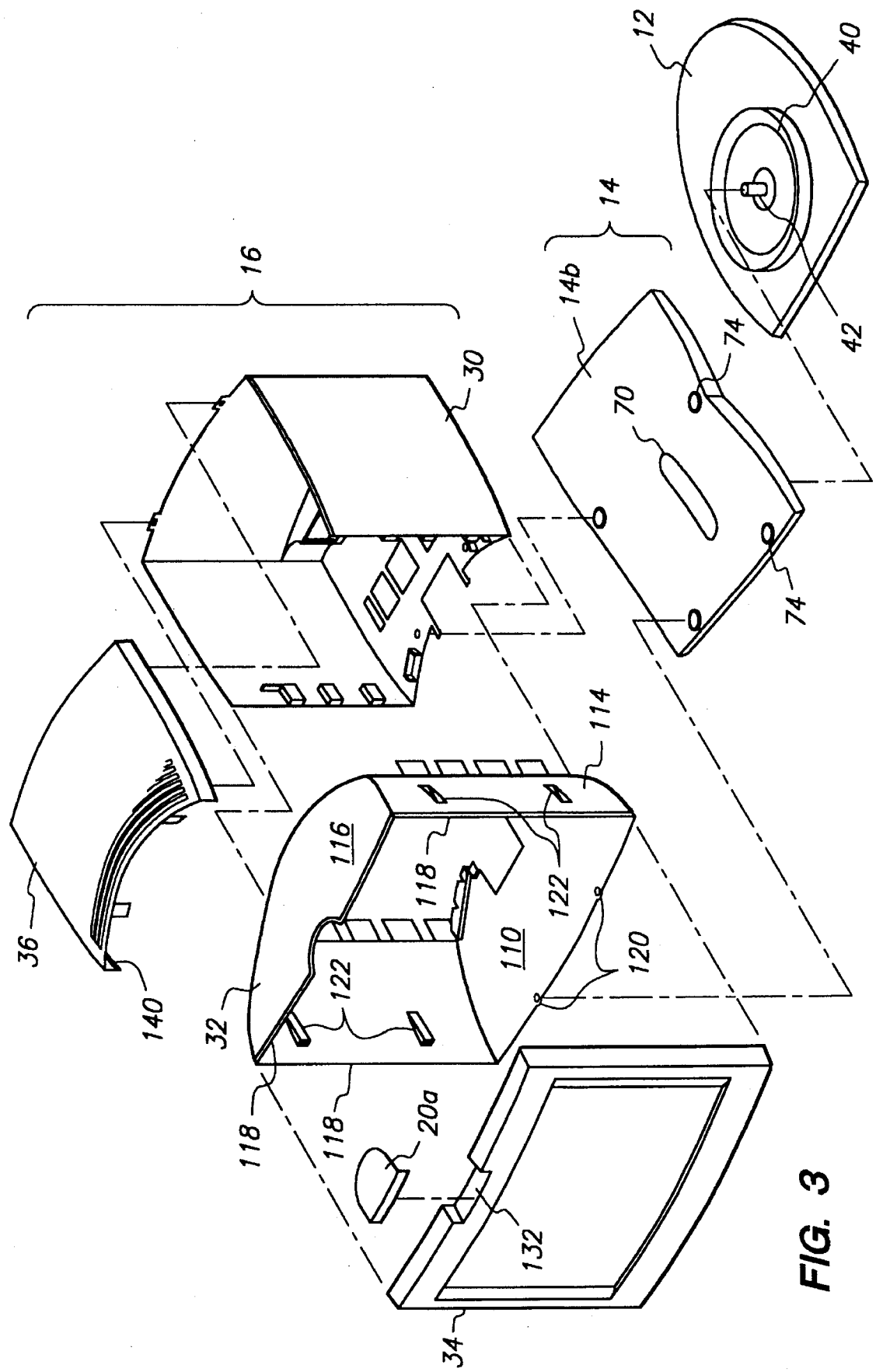
FIG. 3 is an exploded perspective view of a second embodiment of the modular monitor architecture of the present invention.

A comparison between FIGS. 2 and 3 illustrates the interchangeability of the modules 14, 16, 20 provided by the modular monitor architecture 10 of the present invention. FIG. 3 is an exploded perspective view of a second embodiment of the modular monitor architecture 10 of the present invention. The second embodiment shown in FIG. 3 provides the functionality of a standard monitor with video output only and a display chassis that pivots and tilts. In contrast, the first embodiment shown in FIG. 2 is a multimedia version of the monitor that provides video output, audio output and audio input capabilities along with the ability to pivot and tilt the display chassis. The second embodiment is advantageously able to utilize much of the design efforts with regard to the base 12, the display module 16 and the input module 20 that were needed for the first embodiment. In order to create the second embodiment, only tilt/swivel module 14b and input module 20b must be designed. Therefore, with the modular monitor architecture 10 of the present invention, the cost and time to get to market with the second embodiment of the monitor are drastically reduced. Moreover, much of the testing that would normally be undertaken with a new design need not be performed since modules 12, 16 and 20 have already under gone such testing.

Referring now to both FIGS. 2 and 3, the preferred embodiment for the base 12 will be described. In the modular monitor architecture 10, the base 12 preferably has only one configuration. The base 12 is generally planar and has a semi-elliptical shape. Along the longitudinal axis of the base 12 proximate the front, the base 12 has a raised portion 40 that is generally cylindrical. The top of the raised portion 40 is preferably concave. Proximate the center of the raised portion 40, the base 12 has a vertical column member 42 that extends upward in a direction perpendicular to the longitudinal axis of the base 12. The vertical column member 42 mates with the tilt/swivel module 14 to provide for rotation of the tilt/swivel module 14 with respect to the base 12. The bottom of the tilt/swivel module 14 preferably has a convex shape that corresponds to the top of the raised portion 40. The mating of the convex and concave shapes allows the tilt/swivel module 14 and display module 16 to be tilted to adjust the orientation of the screen of the CRT 18 regardless of the direction which the front of the display module 16 faces. The base 12 is preferably constructed of a single piece of hardened plastic using an injection molding process.

Referring also now to FIGS. 4A–4D, the embodiments for the tilt/swivel module 14 will be described. Consistent with the modular monitor architecture 10 of the present invention, all embodiments of the tilt/swivel module 14 have two common features. First, each tilt/swivel module 14 embodiment provides for a tilt and swivel connection with the base 12. Second, each tilt/swivel module 14 embodiment must provide for a static attachment with the display modules 16.

The first embodiment of the tilt/swivel module 14a is shown in FIG. 2. The first embodiment of the tilt/swivel module 14a includes an additional feature of providing audio output. This tilt/swivel module 14a preferably comprises a cover 50, a tray member 52, a front panel 54 and a pair of speakers 56. The front panel 54 defines a pair of rectangular apertures, one proximate each side. The apertures are preferably covered by a perforated screen that allows sound to be output through the front panel 54 while protecting speakers 56 from contact with foreign objects. The tray member 52 forms the bottom, rear and sides of the tilt/swivel module 14a and has generally box like shape. The cover 50 has a generally planar shape and is positioned over the front and middle potions of the tray member 52 to form an audio chamber there between. The sides of the cover 50 and the tray member 52 are extended outward to provide an area to house the speakers 56. Like the base 12, the cover 50 and tray member 52 are preferably constructed of hard plastic using an injection molding process. The cover 50 includes a front wall and a rear wall that extend downward to enclose the area between the cover 50 and the tray member 52. The front wall also defines a pair of openings proximate each side in which the speakers 56 can be mounted. Along the longitudinal axis of the cover 50, a channel 58 extends from the front wall of the cover 50 rearward approximately two thirds the length of the cover 50. An exemplary embodiment of such a sound module 14a is described in detail in U.S. patent application Ser. No. 08/412,704, entitled "Integral Sound Module For A Modular Monitor," filed Mar. 19, 1995, which is incorporated herein by reference.

Referring now to FIGS. 4A and 4B, the features common to all tilt/swivel modules 14 are more clearly shown. FIG. 4A is a bottom plan view of the first embodiment of the tilt/swivel module 14a. The bottom of the tilt/swivel module 14a preferably has a lower body portion 62 that is convex in shape and sized for a tight fit with the convex shape of the top of the raised portion 40 of the base 12. The lower body portion 62 also defines a slot 60 that is sized to receive the vertical column member 42 of the base 12. Movement of the lower body portion 62 about and in the slot 60 allows the tilt/swivel module 14a to be rotated and tilted with respect to the base 12. FIG. 4B shows a top plan view of the first embodiment of the tilt/swivel module 14a. Along the sides of the channel 58, near its front and rear, a plurality of isolation means 64 are each mounted partially in a respective cylindrical enclosure defined by the top of the cover 50. The isolation means 64 are used to mount the tilt/swivel module 14a to the display module 16.

The second embodiment of the tilt/swivel module 14b is shown in FIG. 3. The second embodiment of the tilt/swivel module 14b provides no additional features other than those common to all tilt/swivel modules 14. The tilt/swivel module 14b preferably has a generally planar and rectangular shape with the sides narrowing slightly inward proximate the center. The tilt/swivel module 14b is much thinner than tilt/swivel module 14a since no audio chamber is needed. The tilt/swivel module 14b defines a slot 70 near the front and extending toward the rear along its longitudinal axis. The slot 70, like slot 60, is sized to receive the vertical column member 42 of the base 12. In the area near the slot 70, the tilt/swivel module 14b is bowed to form a lower body portion 72, similar in shape and size to the lower body portion 62. FIG. 4C is a bottom plan view of the tilt/swivel module 14b, and shows the slot 70 and lower body portion 72. The lower body portion 72 and the slot 70 allow the tilt/swivel module 14b to be rotated and tilted with respect to the base 12. FIG. 4D shows a top plan view of the second embodiment of the tilt/swivel module 14b. On the top of the tilt/swivel module 14b, a plurality of cylindrical protrusions 74 are formed. The cylindrical protrusions 74 are for attachment to the display module 16. The cylindrical protrusions 74 preferably have the same shape as the isolation means 64 when positioned in the cylindrical enclosure 66. As can be seen from a comparison of FIGS. 4B and 4D, the cylindrical protrusions 74 have the same positioning on their respective tilt/swivel module 14b as the cylindrical enclosure 66 on tilt/swivel module 14a. This makes each of the modules 14a, 14b fully interchangeable with the other, thus, much of the tooling and design effort can be reused as well as greatly simplifying the process of making monitors with customized features.

In yet a third embodiment (not shown), the tilt/swivel module 14 may be a modified version of the first embodiment 14a so that the front panel has an opening providing access to the channel 58. The opening and channel 58 provide an area for holding other components. for example, a compact disk drive. Those skilled in the art will realize that there are a variety of other ways the tilt/swivel module 14 may be modified to accommodate other features and components.

As was noted above and shown in FIGS. 2 and 3, the display module 16 includes the aft bucket 30, the middle bucket 32, the bezel 34 and the lid 36. The display module 16 provides another level of modularity since the components forming the display module 16 also serve as modules themselves, thus, further reducing the time and effort required to develop a family of model variants such as is required for different sized CRTs. For example, the aft bucket 30 is like the base 12 in that the same aft bucket 30 may be used for several different configurations such as for both a CRT with a 17" display area and a CRT with a 20" display area.

Figure 5:
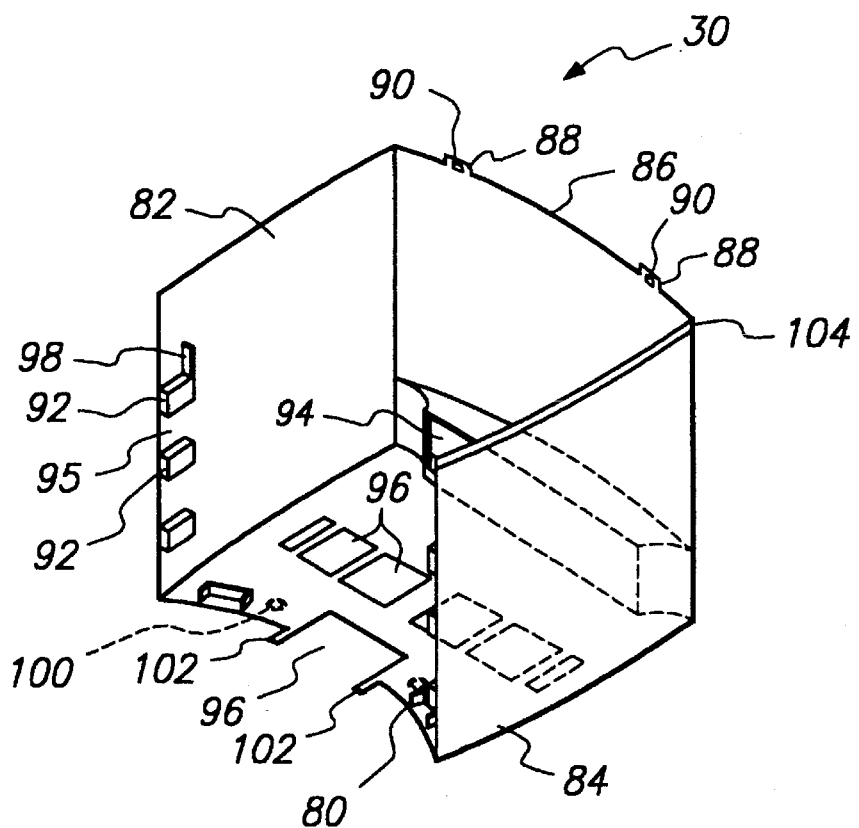
FIG. 5 is front perspective view of a preferred embodiment of an aft bucket of a display module of the present invention.

Referring now to FIG. 5, a front perspective view of a preferred embodiment of the aft bucket 30 is shown. The aft bucket 30 preferably has a generally rectangular box shape. The aft bucket 30 includes a bottom 80, a left side wall 82, a right side wall 84 and a rear wall 86. All the walls 82, 84, 86 have a generally planar shape and are bowed slightly inward. Along the top edges of the left side wall 82, the right side wall 84 and the rear wall 86, each wall 82, 84, 86 is reduced in thickness to create a step 104 on the exterior side of the walls 82, 84, 86. The portion of the walls 82, 84, 86 reduced in thickness mates with a corresponding groove formed in the lid 36. The rear wall 86 also includes a pair of tabs 88 spaced apart along the top edge of the rear wall 86.

The tabs 88 extend upward and define rectangular holes 90 in which corresponding members of the lid 36 are secured. The rear wall 86 also defines a rectangular opening 94 that extends horizontally proximate the bottom 80. The opening 94 provides an area for mounting interconnect structures for providing power and cabling to the CRT 18. Along the interior side of a front edge, the left side wall 82 and the right side wall 84 provide a plurality of teeth 92 extending inward. The teeth 92 define spaces 95 for receiving similar shaped teeth that are on the rear edge of the middle bucket 32. Proximate the top edge of each side wall 82, 84, a retaining wall 98 is created between the top two teeth 92. The retaining wall 98 extends in a plane parallel to the rear wall 86 and provides an area for locking the middle bucket 32 to the aft bucket 30. Finally, the bottom 80 of the aft bucket 30 defines a plurality of openings 96 for attaching structural supports, access to the tilt/swivel module 14, and other needs. The front edge of the bottom 80 has an arcuate shape to conform to the shape of the middle bucket 32. Proximate the front edge, on the exterior side of the bottom 80, a pair of ring shape protrusions 100 are formed. The protrusions 100 are positioned and sized to receive the isolation means 64 or the protrusions 74 of the tilt/swivel module 14. Also, spaced apart along the front edge of the bottom 80 are a pair of fingers 102. The fingers 102 extend forward parallel to the longitudinal axis, and preferably have cantilevered ends distal the bottom 80 for locking to the middle bucket 32. While not shown, those skilled in the art will realize that the walls 82, 84, 86 and bottom 80 may also have a grid of slits to provide ventilation.

Referring back to FIGS. 2 and 3, a front perspective view of the middle bucket 32 is shown. The middle bucket 32 preferably has a generally semi-cylindrical shape formed from a bottom 110, a left side wall 112, a right side wall 114 and a top 116. Along front edges of the bottom 110, left side wall 112, right side wall 114 and top 116, each is reduced in thickness to create a step 118 on its exterior side. The portion of the bottom 110, top 116 and walls 112, 114 reduced in thickness mates with a corresponding groove formed in the bezel 34. Each of the left side wall 112 and the right side wall 114 also defines a pair of cavities 122 positioned intermediate the top 116 and the bottom 110. The cavities 122 extend longitudinally, and provide an area for inserting a fastening means such as a screw to attach the CRT 18 and the bezel 34 to the middle bucket 32. Spaced apart along the front edge, the bottom 110 also provides a pair of disc shaped members 120. The disc shaped members 120 provide a downward extending ring shape 170 similar to ring 100. However, the disc shaped members 120 correspond to and mate with the front protrusions 74 or isolation means 64 of the tilt/swivel module 14. Proximate center of the front edge, the top 116 provides a notch semicircular in shape. The notch defines a portion of the aperture 22 defined by the display module 16 that receives the input module 20.

Figure 6:
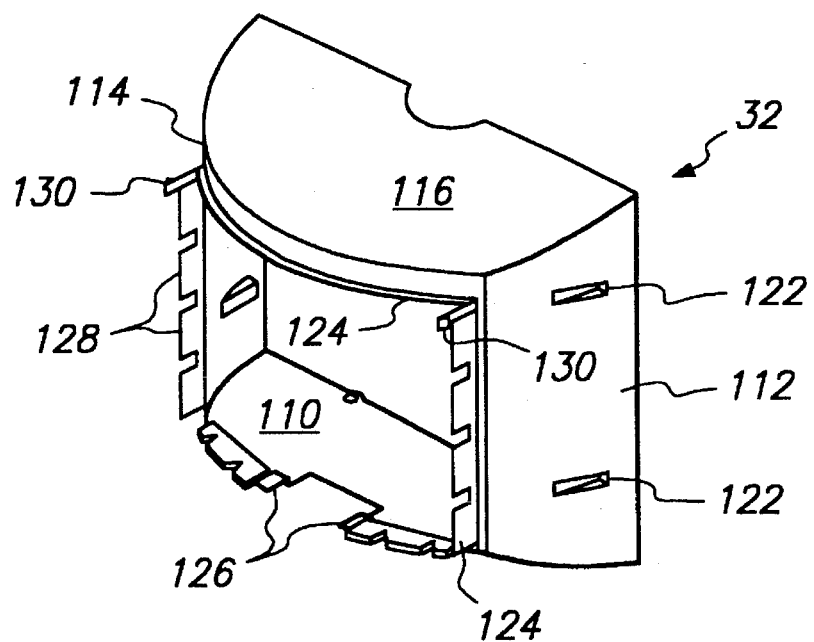
FIG. 6 is rear perspective view of a preferred embodiment of a middle bucket of a display module of the present invention.

Referring to FIG. 6, a rear perspective view of the middle bucket 32 is shown. The rear edges of the bottom 110, top 116 and walls 112, 114 each have a cantilevered band member 124 that extends to the rear and forms a generally square shape. The top 116 and bottom 110 portions of the band member 124 have an arcuate shape. Along the bottom 110, the rear edge of the band member 124 has a sawtooth shape that mates with the corresponding sawtooth shape on the bottom 80 of the aft bucket 30. The bottom 110 of the middle bucket 32 also defines a pair of reliefs 126 proximate the rear edge in between the left and right side walls 112, 114. The reliefs 126 are for receiving and locking with the finger 102 of bottom 80 of the aft bucket 30. Along the interior side of the band members 124 for the left and right side walls 112, 114, a plurality of teeth 128 are positioned vertically spaced apart. The teeth 128 of the middle bucket 32 mate with the teeth 92 of the aft bucket 30. Near the top, each side wall 112, 114 includes a finger 130 that extends backward. The fingers 130 are used to mount the middle bucket 32 to the aft bucket 30 and snap into position with the retaining wall 98 of the aft bucket 30. An exemplary embodiment of the aft and middle bucket and the joint connecting them is described in detail in U.S. patent application Ser. No. 08/418,673, entitled "Multipiece Monitor Bucket Having Vented Joints," filed Apr. 7, 1995, which is incorporated herein by reference.

Referring back to FIGS. 2 and 3, a front perspective view of the bezel 34 is shown. The bezel 34 preferably has a rectangular frame shape with an exterior rear edge adjusted for a close fit over the front edge 118 of the middle bucket 32. The bezel 34 preferably has a U-shape in cross-section. On the top of the bezel 34 near the center, a notch 132 is defined. Together, the notch 132 along with a corresponding semi-circular notch in the front edge of the top 116 of the aft bucket 32 define the aperture 22 that holds the input model 20. While the front of the bezel 34 is shown as being plain with no openings along the bottom portion, those skilled in the art will realize that a variety of bezels 34 could be created depending on the control circuitry provided with the CRT 18. For example, the bezel 34 might include two openings to house input control buttons that allow the user to control the contrast and brightness of the CRT 18. Other embodiments of the bezel 34 can be contemplated to accommodate other display controls that the CRT 18 and its circuitry provide such as a degauss switch button and on/off control.

Referring now to FIGS. 7A and 7B, the level of modularity provided by the display module 16 will be described in more detail. FIGS. 7A and 7B respectively show a top plan and a side view of a first embodiment of the display module 16a of the present invention with a second embodiment of the display module 16b overlaid and shown by phantom lines. From FIGS. 7A and 7B, the modularity provided by the display module 16 and the ability to use components interchangably for an exemplary 17" CRT and 20" CRT is clearly shown. The first embodiment of the display module 16a is designed to hold a 17" CRT, while the second embodiment of the display module 16b is designed to hold a 20" CRT. Like reference numerals are used for like parts and a suffix of either "a" or "b" is provided where the parts are variant and not identical. As can be seen from the top view of the two embodiments 16a, 16b in FIG. 7A, both embodiments 16a, 16b define identically sized apertures 22a, 22b for receiving and holding the input module 20a, 20b. FIG. 7A also illustrates how middle bucket 32a and bezel 34a of the first embodiment 16a differ from middle bucket 32b and bezel 34b of the second embodiment 16b. The bezel 34b and middle bucket 32b are wider on each side to accommodate the larger CRT. The middle bucket 32b also extends further forward providing additional space longitudinally in the display module 16b for a 20" CRT. However, near the rear, both middle buckets 32a, 32b advantageously have the same sized and shaped arcuate bottom and top, and side walls so that either can be attached to the same aft bucket 30. Thus, the need to design, build and test a separate aft bucket for the 20" embodiment is eliminated.

Referring now to FIG. 7B, the side view of the two embodiments of the bezel 34a, 34b, middle bucket 32a, 32b and lid 36a, 36b also illustrate how they differ vertically to accommodate different sized CRTs. In the present invention, the bottom of the bezels 34a, 34b and the middle buckets 32a, 32b have the same shape, thus, ensuring that both the display modules 16a, 16b will join with the tilt/swivel module 14 properly for attachment. Therefore, to provide more interior space for a larger CRT, the second embodiment of the bezel 34b and middle bucket 32b are much taller than the first embodiment of the bezel 34a and the middle bucket 32a, 32b, in addition to being lengthened forward. The coupling of both middle buckets 32a, 32b to the same aft bucket 30 can also be seen. The differing heights of lids 36a and 36b is also illustrated in FIG. 7B. The lids 36a, 36b preferably have the same dimensions except for the side and rear walls of each lid 36a, 36b. The second embodiment of the lid 36b preferably provides side and rear walls that are increased in height by about 50% compared to the side and rear walls of lid 36a. Nonetheless, it should be noted that the means 142 for coupling the lids 36a, 36b to the middle bucket 32 as shown in FIG. 2 and 3 remains the same in either embodiment.

Referring now to FIG. 7C, a bottom plan view of the first embodiment of the display module 16a with the second embodiment of the display module 14b shown in phantom is shown. FIG. 7C illustrates the second attachment means for mounting the display module 14 to the tilt/swivel module 14. For each embodiment, the attachment means is a group of four protrusions 100, 170, 172, and 174. As shown, the first embodiment of the middle bucket 32a provide two protrusions 170 near the front edge of the middle bucket 32a. These protrusions 170 are used with the two protrusions 100 on the aft bucket 30 to provide four points of mating attachment to the tilt/swivel module 14. In contrast, the second embodiment of the middle bucket 32b provides two protrusions 174 near the front edge of the middle bucket 32b and two protrusions 172 near the rear edge of the middle bucket 32b. For the second embodiment of the middle bucket 32b, these four protrusions 172, 174 form the second attachment means and are used to connect the middle bucket 32b and the tilt/swivel module 14. The two protrusions 100 on the aft bucket 30 are not used for attachment with the second embodiment of the middle bucket 32b. Based on the above description of the bezel 34 and the middle bucket 32, those skilled in the art will understand how the modularity of the present invention can be applied to various sized CRTs other than 17" and 20". For example, the bezel 34 and the middle bucket 32 could be modified with the teachings of the present invention to hold a 14" CRT. Thus, the modularity of the present invention allows many varieties of monitors that have different features as well as different sizes to be produced for only a marginal incremental cost of having to redesign the bezel and bucket.

As shown in FIGS. 2 and 3, the lid 36 encloses and is secured on top of the aft bucket 30 and the rear edge of the middle bucket 32. The lid 36 preferably has a generally square planar shape and includes a rear and side walls that extend downward. Along the bottom of the interior edge of the walls, they are reduced in thickness to create a step 140 that mates with the step 104 along the top edges of the aft bucket 30. The rear wall also provides square protrusions that extend forward, and are shaped and sized to fit in the holes 90 of the tabs 88. There are preferably two square protrusions space apart on the interior side of the rear wall in positions corresponding to the tabs 88. Also, the front edge of the lid 36 has a concave arcuate shape adapted for a close fit with the middle bucket 32. Along the front edge a pair of arms 142 extend downward. The arms 142 have enlarged triangular shaped ends that mate and lock into holes on middle bucket 32.

There are three embodiments for the lid 36a, 36b, 36c of the display module 16. FIG. 8A shows a top plan view of the first and second embodiments for the lid 36a, 36b, and FIG. 8B shows a top plan view of the third embodiment for the lid 36c. The first and second embodiments of the lid 36a, 36b have the same size and shape when viewed from the top. They differ only in their height as was discussed above. As shown in FIG. 8A, the first and second embodiments of the lid 36a, 36b have a generally planar shape, as has been described. The front edge of the lids 36a, 36b have a curved shape to match the rear edge of the top 116 of middle bucket 32a for a close fit. The lids 36a, 36b also have a plurality of small ventilation slots 144 extending laterally. FIG. 8B illustrates yet another embodiment for the lid 36c. The lid 36c differs from the others lids 36a, 36b, because it provides slots 146 increased in sized for more ventilation as might be needed for a larger CRT. Otherwise, it has the same general shape as the other embodiments 36a, 36b. Thus, lid 36c could have two configurations, one with shorter walls for use with the 17" middle bucket 32a and another with taller walls for use with the 20" middle bucket 32b. For each embodiment of the lid 36a, 36b, 36c much of the design remains the same. An exemplary embodiment of such lids 36a, 36b, 36c and their engagement with the middle bucket 32 and aft bucket 30 are described in more detail in U.S. patent application Ser. No. 08/456,628, entitled "Monitor Bucket Having A Removable Thermal Vent," filed Jun. 1, 1995, which is incorporated herein by reference. Thus, with the modularity provided by the present invention much of the initial effort used to design the first embodiment, for example, can be used for the second, third and other embodiments thereby yielding significant savings in terms of design time and effort.

FIGS. 9A–9C show some embodiments for the input module 20 of the present invention. The common features for all input modules 20 is that they are shaped to cover aperture 22 on the display module 14. More specifically, each input module 20 provides a step 150 about its periphery that will mate with the step 118 about the notch in the top 116 of the middle bucket 32. The first embodiment of the input module 20a, shown in FIG. 9A, is merely a place holder for sealing off the display module 14 and provides no additional input or output functionality. The input module 20a has a substantially L-shape derived from a front wall 154 that is attached perpendicular to a planar oblong member 152. The front wall 154 is generally rectangular for input module 20a. The end of the planar oblong member 152 distal the front wall 154 has a semi-circular shape in the first embodiment.

The second embodiment of the input module 20b is shown in FIG. 9B and provides the additional functionality of being able to receive input. To that end, a notch 156 extends across a portion of the front wall 154 and the oblong member 152. The notch 156 is preferably positioned near the center of the input module 20b and extends in a longitudinal direction toward the rear. The underside of input module 20b also provides fastening means as known to those skilled in the art for attaching a microphone (not shown) or a IR transceiver (not shown). The notch 156 is provided to allow sound or IR signals to reach sensors of such components mounted on the underside of input module 20b. Otherwise, the front wall 154 and the planar oblong member 152 have the same shape as in the first embodiment.

FIG. 9C shows a top perspective view of a third embodiment for the input module 20c. The third embodiment of the input module 20c provides for the inclusion of a video camera (not shown) and a microphone (not shown) so that the monitor architecture 10 receives video and audio input as well as providing output. The front wall 154 of input module 20c is substantially planar, is mounted perpendicular to the oblong member 152, and is substantially planar and semicircular in shape. The front wall 154 defines an opening 158 behind which a lens of the video camera may be positioned. The front wall 154 also defines an a slot 160 positioned below the opening 158 and extending laterally behind which a microphone may be mounted. As with the second embodiment, the third embodiment of the input device 20c provides fastening means as known to those skilled in the art for attaching the microphone and camera on the underside of oblong member 152. The oblong member 152 in the third embodiment of the input device 20c has a similar shape to the other embodiments, however, it is bowed outward to provide additional room on the interior of the display module 14 to house components such as the microphone and camera when the input module 20c is attached to the display module 14.

While the present invention has been described with reference to certain preferred embodiments, those skilled in the art will recognize that various modifications may be provided. For example, yet another embodiment of the input module 20 might hold a microphone, an IR transceiver and a video camera, as well as providing opening for exposing the sensor portions of each of these components. These and other variations upon and modifications to the preferred embodiment are provided for by the present invention which is limited only by the following claims.

What is claimed is:

1. A modular architecture for a computer monitor comprising:
   a base;
   a tilt/swivel module;
   a first attachment means for attaching the base to the tilt swivel module such that the tilt swivel module is rotatable and tiltable with respect to the base;
   a display module for housing a CRT; and
   a second attachment means for attaching the display module to the tilt/swivel module such that the tilt/swivel module and the display module will rotate and tilt together when either is moved, the second attachment means including a plurality of cylindrical protrusions formed on a top of the tilt/swivel module, and a plurality of ring shape protrusions on the bottom of the display module, each sized and shaped to hole one of the plurality of cylindrical protrusions, and each positioned to correspond to a respective cylindrical protrusion.

2. The modular architecture of claim 1, wherein an aperture is defined proximate top and front of the display module, and the system further comprises an input module sized to fit in and cover the aperture.

3. The modular architecture of claim 2, wherein the input module has a generally L-shape and defines a step about its periphery that will mate a corresponding step about the periphery of the aperture of the display module.

4. The modular architecture of claim 2, wherein the input module has a generally L-shape and defines a slot for exposing a sensor.

5. The modular architecture of claim 2, wherein the input module has a generally L-shape, defines a slot for exposing a sensor, and defines an opening for exposing a lens.

6. The modular architecture of claim 1, wherein the base includes a raised portion that is generally cylindrical, the raised portion having a top that is concave and a vertical column member extending upward.

7. The modular architecture of claim 6, wherein a lower body portion of the tilt/swivel module has a convex shape that corresponds to the top of the raised portion, the lower body portion of the tilt/swivel module defining a slot sized to receive the vertical column member.

8. The modular architecture of claim 1, wherein the first attachment means includes:
   a raised portion with a concave top and a vertical column member on the base; and
   a convex shaped lower body portion of the tilt/swivel module defining a slot sized to receive the vertical column member.

9. The modular architecture of claim 1, wherein the tilt/swivel module has a generally planar and rectangular shape with the sides narrowing slightly inward proximate the center.

10. The modular architecture of claim 1, wherein the tilt/swivel module includes a plurality of isolation means for isolating vibrations between the tilt/swivel module and the display module, and defines a respective cylindrical enclosure for mounting the plurality of isolation means.

11. The modular architecture of claim 1, wherein the tilt/swivel module includes a plurality of cylindrical protrusions formed on a top of the tilt/swivel module.

12. The modular architecture of claim 1, wherein the second attachment means further comprises:
   a plurality of isolation means for isolating vibrations between the tilt/swivel module and the display module, each one of the plurality of isolation means positioned between a respective cylindrical protrusion and a respective ring shape protrusion.

13. A modular architecture for a computer monitor comprising:
   a base;
   a tilt/swivel module;
   a first attachment means for attaching the base to the tilt swivel module such that the tilt swivel module is rotatable and tiltable with respect to the base;
   a display module for housing a CRT comprising:
     an aft bucket having a bottom, a left side wall, a right side wall and a rear wall;
     a middle bucket having a generally semi-cylindrical shape defining a rear opening and a front opening, the rear opening adapted for engagement and attachment to the bottom, left side wall, and right side wall of the aft bucket;
     a bezel having a rectangular frame shape with a rear edge adapted for a close fit over the front opening of the middle bucket; and
     a lid providing a front, side and rear edges, the front edge of the lid adapted for attachment with the rear opening of the middle bucket, and the side and rear edge of the lid adapted for a close fit on the left side wall, right side wall and rear wall of the aft bucket; and
   a second attachment means for attaching the display module to the tilt/swivel module such that the tilt/swivel module and the display module will rotate and tilt together when either is moved.

14. The modular architecture of claim 13, wherein the aft bucket is attachable to either one of a first middle bucket sized and shaped to hold a CRT of a first size and a second middle bucket sized and shaped to hold a CRT of a second larger size.

15. The modular architecture of claim 13, wherein the aft bucket is attachable to either one of a first lid sized and shaped to hold a CRT of a first size and a second lid sized and shaped to hold a CRT of a second larger size.

16. The modular architecture of claim 13, wherein there is a first notch on the front opening of the middle bucket and a corresponding second notch on the rear edge of the bezel, the first and second notches defining an aperture for receiving an input module.

17. The modular architecture of claim 16, wherein the aperture defined by the first and second notches is attachable to one from the group of a first input module, a second input module defining a slot for exposing a sensor, and a third input module defining a slot for exposing a sensor and defining an opening for exposing a lens.

18. A modular architecture for a computer monitor comprising:

a base;

a tray member;

a cover attached on the top of the tray member and forming an audio chamber between the cover and the tray member;

a speaker attached to the cover and enclosing the audio chamber;

a first attachment means for attaching the base to the tray member such that the tray member is rotatable and tiltable with respect to the base;

a display module for housing a CRT;

a second attachment means for attaching the display module to the cover such that the cover, tray member and the display module will rotate and tilt together when either is moved.

\* \* \* \* \*

UNITED STATES PATENT AND TRADEMARK OFFICE
CERTIFICATE OF CORRECTION

PATENT NO.   : 5,587,876
DATED        : December 24, 1996
INVENTOR(S)  : John O'Brien and Jonathan Ive It is certified that error appears in the above-indentified patent and that said Letters Patent is hereby corrected as shown below:

Column 1, line 8, delete "1992" and insert --1995--.

Column 3, line 36, after ";" delete the --.--.

Column 11, line 34, delete "tillable" and insert --tiltable--.

Column 11, line 44, delete "hole" and insert --hold--.

Signed and Sealed this

Twenty-ninth Day of April, 1997

Attest:

BRUCE LEHMAN

Attesting Officer    Commissioner of Patents and Trademarks